US009126567B2

(12) United States Patent  
Rogalla et al.

(10) Patent No.: US 9,126,567 B2
(45) Date of Patent: Sep. 8, 2015

(54) TIRE INFLATING DEVICE

(71) Applicant: Schenck RoTec GmbH, Darmstadt (DE)

(72) Inventors: Martin Rogalla, Darmstadt (DE); Mark Ortwein, Darmstadt (DE); Andreas Peinelt, Pfungstadt (DE)

(73) Assignee: Schenck RoTec GmbH, Darmstadt (DE)

( * ) Notice: Subject to any disclaimer, the term of this patent is extended or adjusted under 35 U.S.C. 154(b) by 149 days.

(21) Appl. No.: 14/138,584

(22) Filed: Dec. 23, 2013

(65) Prior Publication Data

US 2014/0311626 A1    Oct. 23, 2014

(30) Foreign Application Priority Data

Apr. 19, 2013 (DE) .................... 10 2013 104 007

(51) Int. Cl.
*B60C 25/14* (2006.01)
*B60S 5/04* (2006.01)

(52) U.S. Cl.
CPC *B60S 5/04* (2013.01); *B60C 25/145* (2013.04)

(58) Field of Classification Search
CPC .......... B60C 25/14; B60C 25/145; B60S 5/04
USPC .......................... 141/38; 157/1.17, 1.21, 1.24
See application file for complete search history.

(56) References Cited

U.S. PATENT DOCUMENTS 2,900,015 A * 8/1959 Harrison ................... 157/1.1
2,936,827 A * 5/1960 Riggs ....................... 157/1.1
3,016,934 A * 1/1962 Smyser ...................... 157/14
3,528,474 A * 9/1970 May ........................... 157/1.1
3,700,021 A * 10/1972 Motis ......................... 157/1.1
3,774,664 A * 11/1973 Matysak ................... 157/1.1
3,783,928 A * 1/1974 Lee ............................ 157/1.1
3,866,654 A * 2/1975 Duquesne .................. 157/1.1

(Continued)

FOREIGN PATENT DOCUMENTS

DE         100 07 019 A1     8/2001
DE    10 2009 046 195 B3     3/2011

(Continued)

OTHER PUBLICATIONS

European Search Report in 14165097.8, dated Sep. 19, 2014, with English translation of relevant parts.

*Primary Examiner* — Nicolas A Arnett
(74) *Attorney, Agent, or Firm* — Collard & Roe, P.C.

(57) ABSTRACT

In a tire inflating device having a machine frame (2), a tire filling bell (4) arranged on the machine frame (2) and a supporting and sealing device (5) for sealing a filling chamber. The tire filling bell (4) is comprised of a filling plate (10) and a separate filling ring (11). A magazine (3) has a magazine rack (20) and magazine guides (21) lying in a plurality of parallel planes, each of said guides being able to hold a filling ring (11, 11') mounted so that it can move. The magazine rack (20) and the filling plate (10) can be moved with respect to each other into a plurality of transfer positions in the direction of the axis of rotation. The magazine guide (21) in each case is connected to a filling plate guide (18) arranged on the filling plate (10) in said transfer positions. A filling ring (11) which is located in the magazine guide (21) arranged in the transfer position can be conveyed by a conveying device (40) into a filling plate guide and a centered position on the filling plate (10).

18 Claims, 8 Drawing Sheets

(56) References Cited

U.S. PATENT DOCUMENTS

| | | | |
|---|---|---|---|
| 3,978,903 A * | 9/1976 | Mueller et al. | 157/1.2 |
| 4,183,392 A * | 1/1980 | Kane | 157/1.1 |
| 4,699,185 A * | 10/1987 | Cargould et al. | 141/1 |
| 4,735,250 A * | 4/1988 | Kane | 157/1.1 |
| 4,947,919 A * | 8/1990 | Timlin | 157/1.24 |
| 5,035,274 A * | 7/1991 | Kinnick et al. | 157/1.1 |
| 5,072,765 A * | 12/1991 | Kane et al. | 157/1.1 |
| 5,094,284 A * | 3/1992 | Curcuri | 157/1.17 |
| 5,146,969 A * | 9/1992 | Kawabe et al. | 157/1.1 |
| 5,657,673 A * | 8/1997 | Fukamachi et al. | 157/1.17 |
| 6,029,716 A * | 2/2000 | Hawk | 141/38 |
| 6,076,586 A * | 6/2000 | Hans | 157/1.17 |
| 6,148,892 A * | 11/2000 | Koerner et al. | 157/1.1 |
| 6,176,288 B1 * | 1/2001 | Kane et al. | 157/1 |
| 6,463,982 B1 * | 10/2002 | Doan | 157/1.1 |
| 6,467,524 B2 | 10/2002 | Ronge et al. | |
| 6,502,618 B1 * | 1/2003 | Kane et al. | 157/1.2 |
| 6,675,857 B2 * | 1/2004 | Kimbara et al. | 157/1 |
| 6,918,423 B2 * | 7/2005 | Pellerin et al. | 157/1.2 |
| 6,923,200 B2 * | 8/2005 | Gonzaga | 137/224 |
| 7,044,188 B2 * | 5/2006 | Pellerin et al. | 157/1.17 |
| 7,367,375 B2 * | 5/2008 | Lawson et al. | 157/1.17 |
| 7,506,671 B2 | 3/2009 | Peinelt et al. | |
| 7,640,963 B2 * | 1/2010 | Lawson et al. | 157/1.17 |
| 8,096,328 B2 * | 1/2012 | Hoenke | 141/38 |
| 8,161,650 B2 * | 4/2012 | Lawson et al. | 29/894.31 |
| 8,448,686 B2 * | 5/2013 | Rudebeck | 157/1.17 |
| 8,522,437 B2 * | 9/2013 | Lawson et al. | 29/894.31 |
| 8,613,296 B2 * | 12/2013 | Lemser et al. | 141/38 |
| 8,757,218 B2 * | 6/2014 | Hoenke et al. | 141/4 |
| 8,769,807 B2 * | 7/2014 | Lawson et al. | 29/783 |
| 8,770,236 B2 * | 7/2014 | Reece et al. | 141/38 |
| 2001/0013396 A1 * | 8/2001 | Ronge et al. | 157/1.17 |
| 2004/0140058 A1 * | 7/2004 | Pellerin et al. | 157/1.2 |
| 2005/0006031 A1 * | 1/2005 | Pellerin et al. | 157/1.17 |
| 2007/0074823 A1 | 4/2007 | Reece et al. | |
| 2011/0100502 A1 | 5/2011 | Lemser et al. | |

FOREIGN PATENT DOCUMENTS

| | | |
|---|---|---|
| EP | 1 125 772 B1 | 8/2001 |
| EP | 1 671 820 B1 | 6/2006 |
| WO | 2009/155503 A2 | 12/2009 |

* cited by examiner

TIRE INFLATING DEVICE

CROSS REFERENCE TO RELATED APPLICATIONS

Applicants claim priority under 35 U.S.C. §119 of German Application No. 10 2013 104 007.1 filed Apr. 19, 2013.

FIELD OF THE INVENTION

The invention relates to a tire inflating device to which a wheel comprising a wheel rim and a tubeless tire fitted to the wheel rim can be supplied, said device having a tire filling bell and having a sealing device for sealing the filling chamber, the tire filling bell comprising a filling plate which can be moved along the axis of rotation of the wheel and a separate filling ring which can be selected from a plurality of mutually interchangeable filling rings with different diameters and moved into a centered position with respect to the axis of rotation, the filling ring located in the centered position being able to be applied to the filling plate with a first edge and moved together with said plate, and a second edge of the filling ring located in a centered position facing away from the filling plate being able to be applied against a side face of the tire. The invention also relates to a method for filling tubeless tires fitted to a wheel rim.

BACKGROUND OF THE INVENTION

During automatic series production, motor vehicle wheels having tubeless tires are usually filled with compressed air in an automatic tire inflation station which is an integral part of the assembly line. In this process the rim with the tire fitted is placed on a suitable support plate which seals the wheel from beneath during the filling process. A filling bell is positioned on the upper side of the tire, said bell sealing the tire and the rim from above, and through which the sidewall of the tire is pressed downwards during the filling process until an annular gap is formed between the tire bead and the rim, through which the compressed air passed into the filling bell can flow into the tire. The compressed air flowing into the tire presses the tire against the base plate and the filling bell with considerable force. Once the filling pressure is reached, the filling bell is raised, causing the sidewalls of the tire to move apart in the axial direction until the tire beads have taken up their respective seat position on the rim. For the purpose of such a filling operation, the filling bell must have an opening with a diameter which is on the one hand large enough so that the filling bell does not come into contact with the rim, but can be placed over the rim. On the other hand, the diameter of the opening must not be so large that the filling bell touches the upper sidewall of the tire radially apart from its highest point. The filling bell would in this case impede radial movement of the tire, which might cause the tire bead not to spring back into its seat correctly. A filling bell is thus only suited to a limited range of motor vehicle wheel sizes.

In a tire inflating station which is known in the art from DE 100 07 019 A1, the wheel/tire arrangement is stored in the tire inflating station such that it is positioned with the bottom side surface of the tire sealed on a base plate. A tire filling bell is located above the upper side of the wheel/tire arrangement, said bell being lowered for the tire inflation process and the tire sidewall being pressed away from the rim with its annular edge so that an annular space is formed between the sidewall of the tire and the wheel rim, via which the tire is filled with compressed air. Wheels with different tire sizes and/or rim sizes can be filled to a restricted extent due to the formation of two filling bells fitted inside one another with two different diameters.

To extend the range of tire sizes to be filled in the same tire inflating station, a tire inflating station of the type mentioned at the outset and known from EP 1 671 820 B1 comprises a tire filling bell having a plurality of filling rings of different diameters, a filling ring with an appropriate diameter being used according to the size of the tire. The filling rings are fixed in an annular manner to holders on a central motion device and can be moved with said motion device around a circle into the centered position with respect to the axis of rotation of the wheel and axially. A respective filling ring which has been moved into the centered position forms the filling bell together with a filling plate and can be moved with one edge against the side surface of a tire to be inflated. The space required for this known tire inflating station is regarded as a disadvantage.

The tire inflating station in DE10 2009 046 195 B3 is a filling device having a carrier plate arranged on the underside of said device, said carrier plate being mounted in a straight guide so that it can move to and fro along an axis between a plurality of positions, the filling rings being fixed in a gastight manner one behind the other on the underside of the carrier plate, when viewed in the direction of motion, the carrier plate comprising a respective through-opening inside the filling rings, and another of the through-openings being connected to the filling opening for the filling device positioned on the upper side of the carrier plate in each of the plurality of positions of the carrier plate. The space required to apply more than three filling rings to the carrier plate is also disadvantageous in this case.

SUMMARY OF THE INVENTION

The object of the invention is to design a tire inflating device of the specified type which is suited for a wide range of different tire sizes while having low space requirements. The tire inflating device should also be able to be manufactured economically, be reliable and low-maintenance and guarantee high filling accuracy.

According to the invention, the tire inflating device to which a wheel comprising a wheel rim and a tubeless tire can be supplied comprises a machine frame, a tire filling bell arranged on the machine frame and a sealing device for sealing a filling chamber. The tire filling bell comprises a filling plate and a separate filling ring which can be selected from a plurality of mutually interchangeable filling rings with different diameters and moved into a centered position with respect to the axis of rotation of the wheel, the filling plate and a first edge of a filling ring located in the centered position being able to be applied to each other and the filling plate being able to be moved together with the filling ring along the axis of rotation, and a second edge of the filling ring located in the centered position facing away from the filling plate being able to be applied against a side face of the tire. The tire inflating device also comprises a filling ring magazine having a magazine rack which has holders formed from magazine guides lying in a plurality of parallel planes intersecting the axis of rotation, a filling ring being able to be held in each of said holders and moved transversely to the axis of rotation, the magazine rack and the filling plate being able to be moved with respect to each other in the direction of the axis of rotation into a plurality of transfer positions in which the magazine guide for each of the holders is connected to a filling plate guide located on the filling plate, and a filling ring, which is located in the magazine guide arranged in the transfer position, can be conveyed by a conveying device into the filling plate guide and into the centered position in this guide.

In the tire inflating device according to the invention, the filling rings with different diameters are preferably arranged on top of one another or next to each other stacked in a magazine which is located outside the working area required to move the filling bell and supply the wheel to be filled. The design of the magazine has the advantage that the space required to provide the various filling rings is very small and the individual filling rings can be transported into the centered position on the filling plate by means of simple and cost-effective devices. The filling rings do not need to be very tall, which means that the amount of compressed air required during filling can be minimized.

To move the magazine rack and the filling plate into the transfer position for supplying and discharging a filling ring, it is merely necessary to move the filling plate or the magazine rack in the direction of the axis of rotation. If the filling plate is displaced for this purpose, the displacement path of the filling plate must be increased in accordance with the number of transfer positions. A complicated device for conveying the filling rings into the filling plate guide is also required in this operation.

A preferred configuration of the invention proposes therefore that the magazine rack should be able to be moved in the direction of the axis of rotation into the transfer positions by means of a magazine drive device arranged on the magazine rack. This design has the advantage that the same transfer position can always be accessed with the magazine, and the transfer position can be the resting position of the filling plate. Accordingly, just one conveying device working in the region of the one transfer position is also required to push the respective filling ring into the centered position beneath the filling plate.

It has also been shown to be advantageous if, in the movable magazine rack, the magazine guide located in the transfer position is connected to the filling plate guide by means of an intermediate guide located between the latter, said intermediate guide being attached to the fixed machine frame. The resulting fixed intermediate guide reduces the tolerance requirements for alignment of the movable guides with the connection points and makes it possible to have a greater distance between the machine frame and the tire inflating device, so that there is enough room for supplying the wheel, for the equipment to hold and center the wheel and for moving the filling plate.

In a further proposal according to the invention, the guides for the filling rings may each comprise two parallel guide rails and the filling rings may be equipped with a frame which comprises rotatably mounted rollers or sliding blocks on opposite sides to each other, said rollers or sliding blocks forming a positive guide with the guide rails. The guides for the filling rings preferably have guide rails with a U-shaped profile, the two hollow profile sides of the guide rails facing each other and the rollers or sliding blocks on the hollow profile sides engaging in the guide rails when the frame is positioned between the guide rails. The design of the guides guarantees safe support and ease of movement of the filling rings.

The conveying device for transporting the filling rings from the magazine into the operating position beneath the filling plate may, according to the invention, be located on the machine frame and may drive a drive head which is guided movably on a drive head guide parallel to the magazine guides and which can be coupled to a filling ring which is arranged in the holder located in the transfer position. Different linear drives may be used to drive the drive head. It is particularly advantageous if the conveying device comprises a crank mechanism having a crank driven by a motor and a coupling rod which transmits the rotary movement of the crank to a drive head. This design of the conveying device makes it possible to quickly displace the respective filling ring from one end position into another end position in the guides, the crank mechanism causing a harmonious and smooth transition of forces to accelerate and slow down the conveyed filling ring.

According to the invention, the drive head of the conveying device may comprise a coupling element which works together with counter-coupling elements attached to the filling rings. In this case the coupling element and counter-coupling element are advantageously designed such that they can be engaged with each other or separated from each other by a movement relative to each other in the direction of the axis of rotation. As the magazine rack and the filling plate are moved in the direction of the axis of rotation, the connected filling ring is automatically disconnected from the drive head when the filling plate or the magazine rack leaves the transfer position.

According to the invention, the drive head guide can advantageously be located on the outer side of the magazine rack facing away from the magazine guides and on an inner side of the machine frame facing the magazine rack so that the movement path of the drive head runs outside the magazine rack. Carriers can be fixed to the filling rings for connection to the drive head, said carriers gripping around the respective magazine guide when the filling rings are arranged in the magazine and carrying the counter-coupling element on their outer side lying outside the magazine frame. This design also makes it possible to create a movement area between the magazine rack and the machine frame in which the crank and the coupling rod connecting the drive head and crank to each other can be positioned.

In a further proposal according to the invention, the magazine frame may be guided in a movable manner on the machine frame in a frame guide parallel to the axis of rotation. Such a guide defines the area of movement of the magazine rack in the direction perpendicular to the axis of rotation and ensures that all magazine guides are the same small distance from the adjacent intermediate guide or filling plate guide in their transfer position.

According to the invention, an advantageous magazine drive device may comprise a spindle which can be driven in rotation and which has an outer thread, said spindle being engaged by its thread with a nut equipped with an inner thread and being supported on the magazine rack such that it cannot rotate. The spindle can be arranged such that it is suspended vertically and be designed to support the magazine rack. To this end the spindle may be rotatably mounted so that it is fixed axially in an axial bearing which is supported in a cross-member of the machine frame, said axial bearing and said cross-member being advantageously arranged such that the central axis of the spindle runs close to the center of gravity or in the center of gravity of the magazine rack loaded with filling rings. The fact that the spindle is arranged close to the center of gravity largely avoids shearing forces and clamping forces in the rack guide system and ensures ease of movement of the magazine rack.

To avoid clamping and shearing forces in the guide and on the spindle, it can also be helpful if spherical bearing surfaces support the axial bearing on the cross-member and the nut a cross-beam of the magazine rack in each case, the mid-points of said bearing surfaces lying on the central axis of the spindle. As a result, the spindle and the nut can be aligned with respect to each other and constraining forces caused by changes in shape of the racks under load can be avoided.

Each filling ring may have at least one positioning hole into which a pin located on the filling plate can be inserted for precise positioning of the respective filling ring with respect to the filling plate when the respective filling ring is fixed in the centered position on the filling plate. Also, a pin which can be moved by means of an actuator can be moved out of the filling plate to align the filling ring before fixing to the filling plate.

Clamping devices can also be arranged on the filling plate and used to clamp a filling ring located in the centered position on the filling plate against the filling plate with its first edge. Clamping the filling ring ensures that the filling ring is held in a fixed position on the filling plate during the inflation processes and whilst the filling plate is in motion and ensures that a seal arranged between the filling ring and the filling plate remains clamped in position and reliably sealed in all operating conditions.

The clamping devices can be positioned on the upper side of the filling plate facing away from the filling ring and have a clamping arm which can be moved perpendicular to the filling plate, said clamping arm gripping beneath a clamping anchor of the filling ring protruding over the edge of the filling plate and angled at its end. Each clamping anchor is preferably formed by the carrier with which the filling rings can be connected to the drive head.

According to the invention, the tire filling bell is moved in the direction of the axis of rotation with one hydraulic control cylinder fixed to the machine frame and two pneumatic cylinders fixed to the machine frame and arranged in parallel with the control cylinder, the piston rod of the control cylinder and the piston rods of the pneumatic cylinders being fixed to the filling plate, and the control cylinder being connected to a hydraulic control circuit with which the path and speed of movement of the tire filling bell generated by the pneumatic cylinders can be controlled. Precise control of the movement of the tire filling bell generated by pneumatic energy is possible in this manner. The hydraulic control cylinder and its piston rod can also be rigidly connected to the machine frame or the filling plate and thus ensure parallel displacement of the filling bell.

BRIEF DESCRIPTION OF THE DRAWINGS

The invention is explained below in further detail on the basis of an embodiment of the invention which is illustrated in the drawings in which.

DETAILED DESCRIPTION OF THE DRAWINGS

Figure 1:
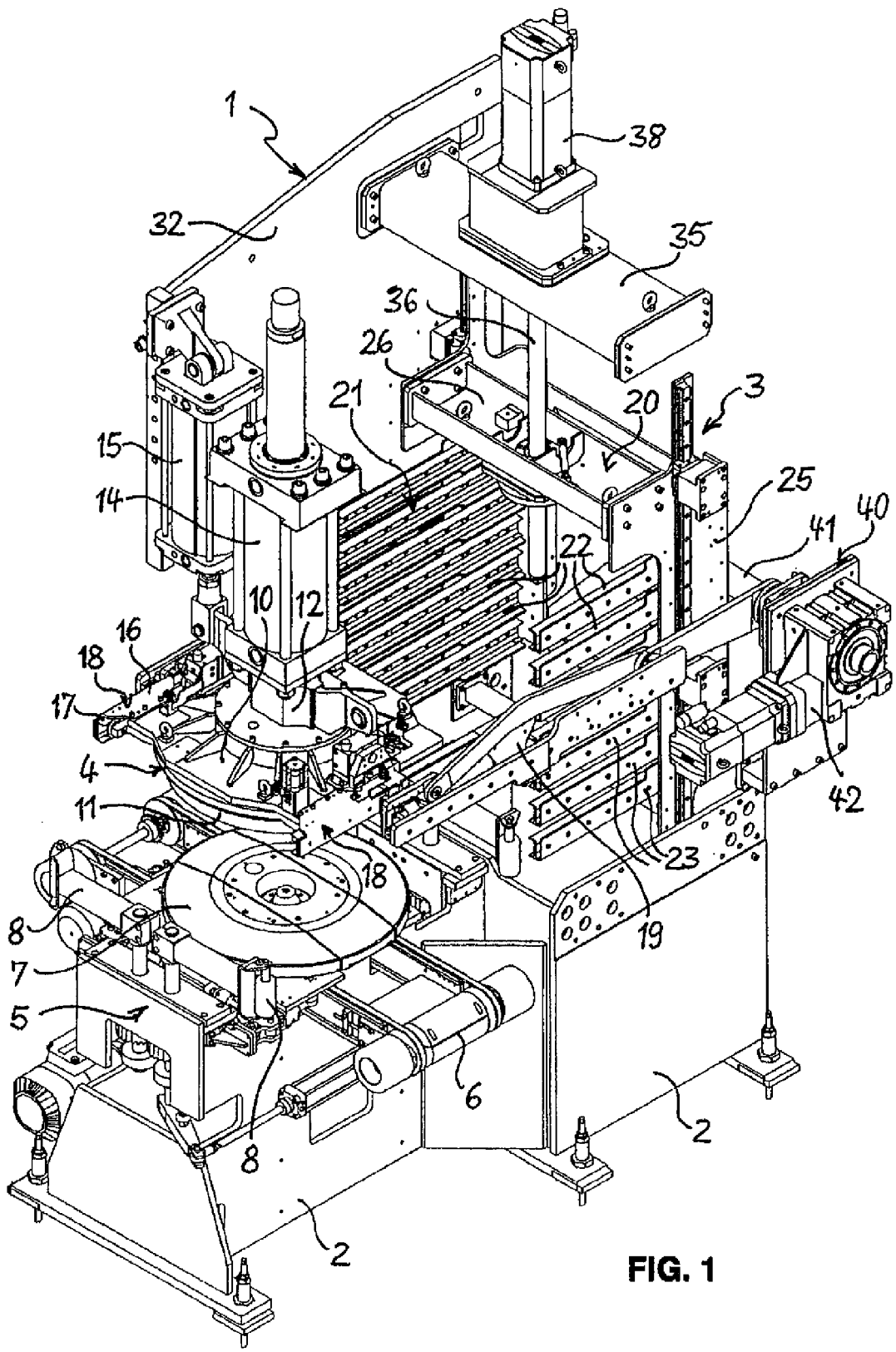
FIG. 1 shows a perspective view of a tire inflating device according to the invention.
Figure 2:
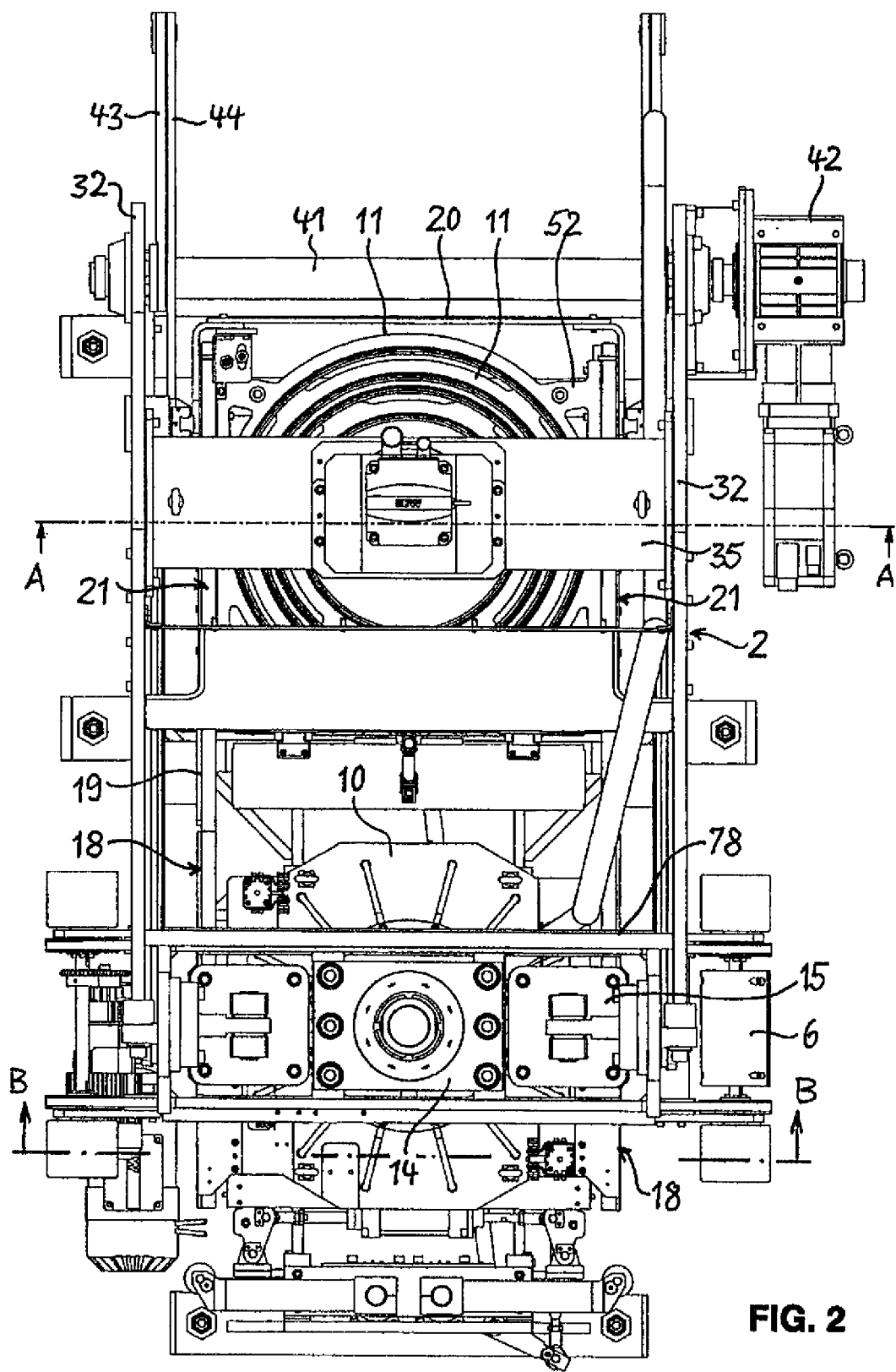
FIG. 2 shows a view of the tire inflating device according to FIG. 1 from above.

FIG. 1 shows a tire inflating device 1 having a machine frame 2 with its front side wall removed in the viewing direction in order to reveal details of a magazine 3 located behind said wall. The tire inflating device 1 comprises a tire filling bell 4 and a supporting and sealing device 5 to which a wheel having a pre-fitted tire is supplied by means of a transport device 6 and with one side mounted horizontally on a plate-shaped table 7 of the supporting and sealing device 5. A tire fitting station is usually located upstream of the tire inflating device 1, the tire being fitted to the wheel rim in said fitting station.

The supporting and sealing device 5 and the transport device 6 are described in EP1 125 772 B1 and its content is referred to here. The supporting and sealing device 5 is constructed in multiple sections. The plate-shaped table 7 is subdivided into a plurality of sections and supported on the machine frame 2. Its diameter is larger than the diameter of the support surface of the largest tire to be inflated. The transport device 6 comprises two transport means e.g. transport chains or belts, running in a horizontal transport plane spaced apart from each other, said chains or belts being mounted on the machine frame 2. In the transport phase, the wheel is transported to a central position beneath the tire filling bell 4 with the transport device 6 in the raised position and the table 7 divided and the wheel is then placed on the table 7 of the supporting and sealing device 5 by lowering the transport device 2. The transport device 6 is then lowered and the table 7 of the supporting and sealing device 3 is closed to form a sealing face. After centering the wheel by means of a centring device 8, the tire filling bell 4 is brought into contact with the deflated tire and the tire is inflated with compressed air which is passed into the tire filling bell 4. After inflation, the tire filling bell 4 is lifted off the wheel and the wheel is transported onwards.

As can be seen in FIG. 1, the tire filling bell 4 is in a centered position above the supporting and sealing device 5. The tire filling bell 4 substantially comprises a filling plate 10 having a flat underside and a cylindrical filling ring 11, which is fixed to the underside of the filling plate 10 such that it can be removed and can be exchanged for other filling rings with a different diameter. The filling plate 10 is equipped with reinforcing ribs on its upper side and firmly connected to a yoke 12 to which are fixed the piston rods of a hydraulic control cylinder 14 in a central position and of two pneumatic cylinders 15 arranged on both sides of the control cylinder 14. The filling plate 10 has two parallel edges on which a mounting rail 16 and a guide rail 17 fixed to said mounting rail 16 are respectively attached in a mirror image arrangement and design, together forming a filling plate guide 18. The guide rails 17 have a U-shaped profile and their hollow profile sides face each other. The filling ring 11 is mounted in the guide rails 17 by means of rollers which are rotatably fixed on parallel longitudinal sides of a frame attached to the filling ring 11.

Figure 3:
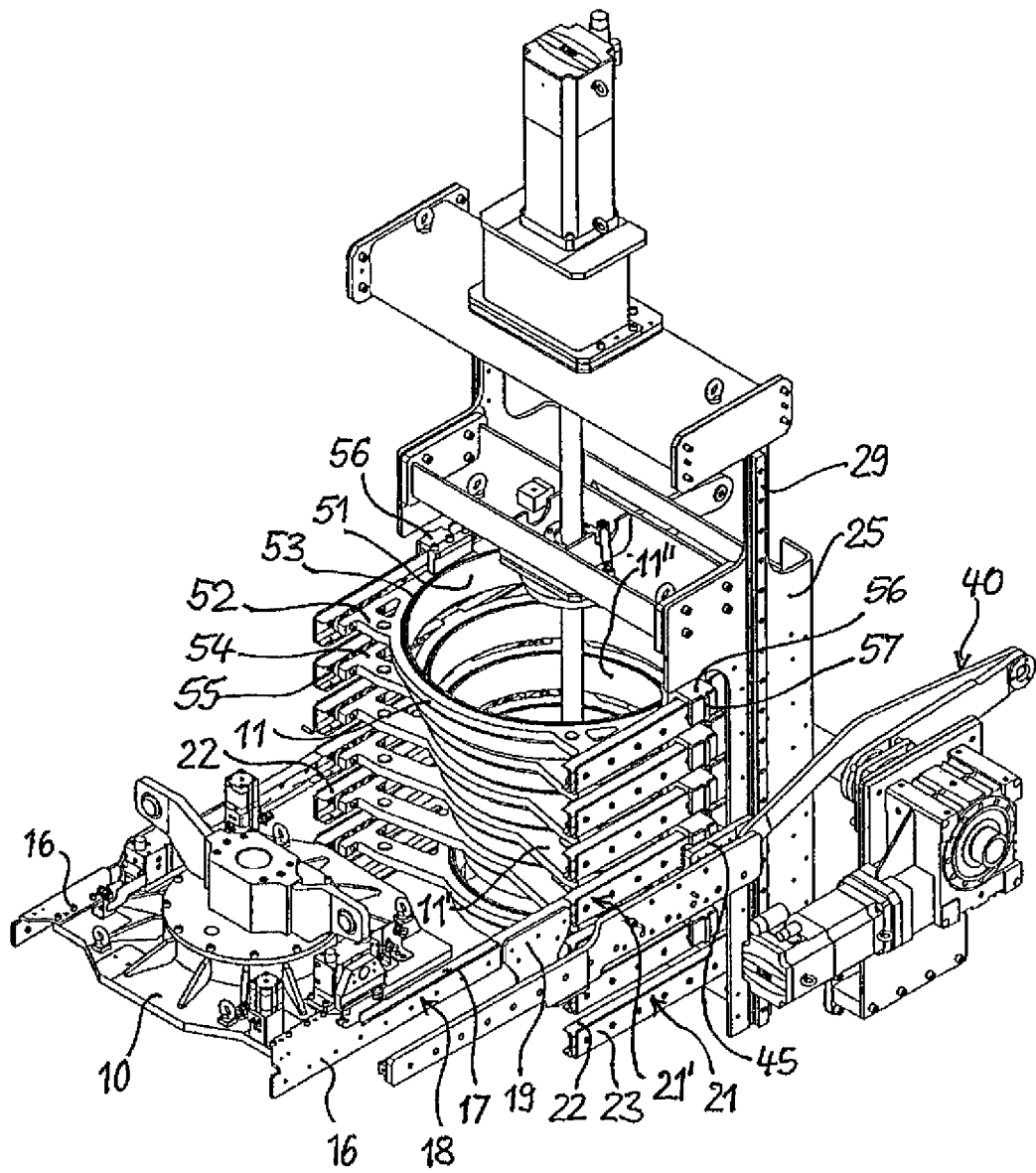
FIG. 3 shows an isolated perspective view of the guides in the tire inflating device according to FIG. 1.

FIGS. 1 and 3 show the tire filling bell 4 in a resting position in which an intermediate guide 19 is connected to the filling plate guide 18, said intermediate guide also comprising U-shaped guide rails and extending the filling plate guide 18 in the direction of the magazine 3. The intermediate guide 19 is firmly connected to the machine frame 2.

In the position shown in FIG. 3, the ends of a magazine guide 21' arranged in a magazine rack 20 are in a transfer position on the intermediate guide 19 on the side of the intermediate guide 19 facing away from the filling plate guide 18. The magazine rack 20 contains a plurality of additional magazine guides 21 in a parallel configuration on top of one another and said magazine guides are all designed uniformly and have respective U-shaped guide rails 22 which have their hollow profile sides facing each other and are fixed to mounting rails 23. The mounting rails 23 are attached to the inner sides of two parallel frame stringers 25 which are connected to each other by a top cross-beam and a bottom cross-beam 26. The mounting rails 23 are wider at their rear ends and fixed to the frame stringers 25 on the magazine rack 20 and extend in a cantilevered manner from the frame stringers 25 together with the guide rails 22 to a vertical plane which is adjacent to the end of the intermediate guide 19 facing the magazine 3. By displacing the magazine rack 20 vertically, all magazine guides 21 can be moved into a transfer position located directly opposite the intermediate guide 19.

Figure 4:
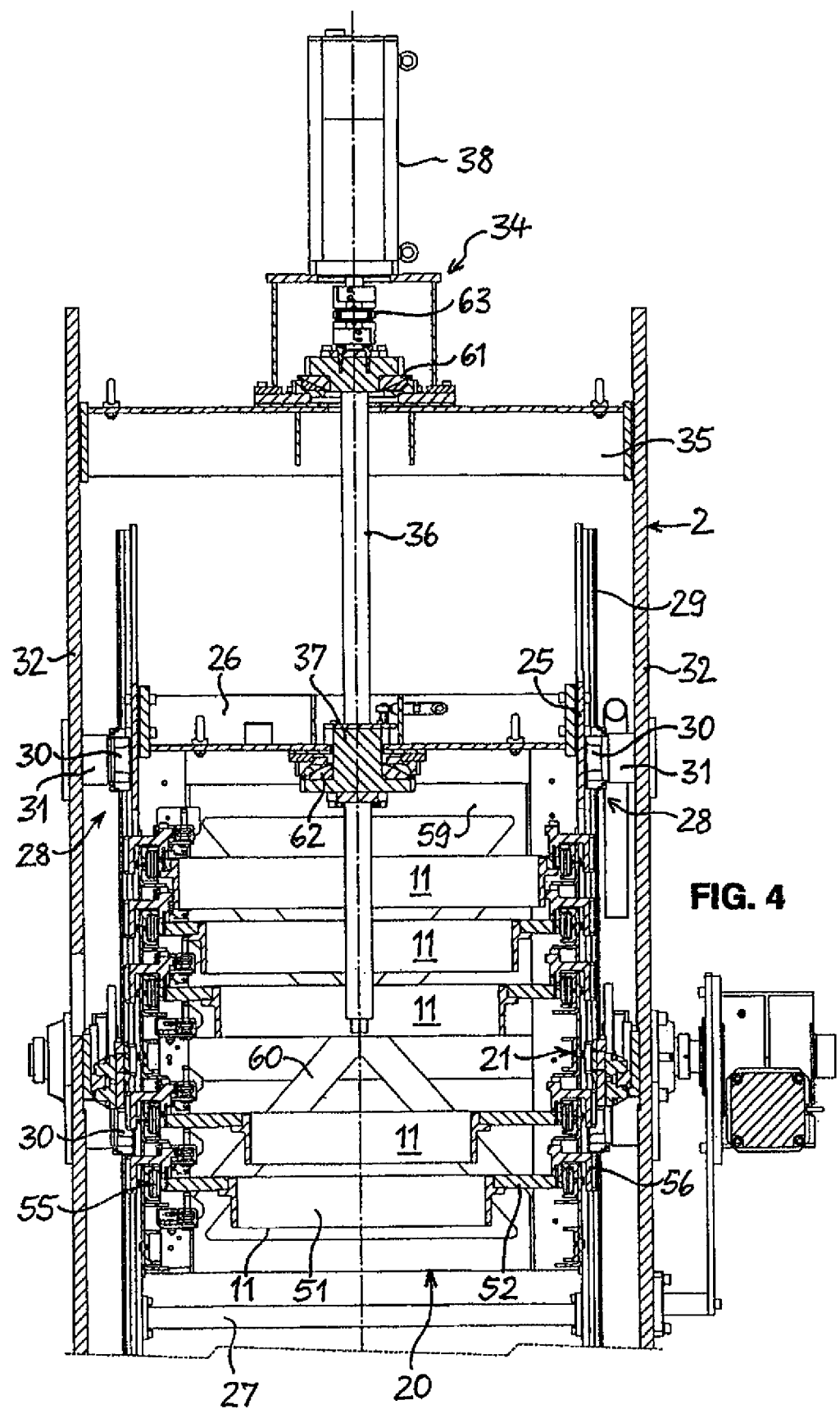
FIG. 4 shows a cross-section along line A-A in FIG. 2 of the tire inflating device according to FIG. 1.

As can also be seen in FIG. 4, the magazine rack 20 is guided on the machine frame 2 in a rack guide 28 such that it can be moved in a vertical direction. The rack guide 28 comprises two opposite guide rails 29 fixed to the outer sides of the frame stringers 25, said guide rails extending in the vertical direction. The guide rails 29 are mounted in sliding blocks 30 such that they can move longitudinally, said blocks being fixed to side walls 32 of the machine frame 2 by means of spacers 31. The magazine rack 20 is moved with the aid of a magazine drive device 34 which is fixed to a cross-member 35 of the machine frame 2 and comprises a spindle 36 equipped with an outer thread and with one end mounted rotatably on the cross-member 35. The spindle 36 is engaged by its thread with a nut 37 equipped with an inner thread supported on the cross-beam 26 and is driven in rotation by a reversible motor 38. The nut 37 is connected to the cross-beam 26 such that it cannot rotate.

In order to convey a filling ring 11 from the magazine 3 to beneath the filling plate 10 or from beneath the filling plate 10 to the magazine 3, a conveying device 40 is arranged on the magazine rack 20. The conveying device 40 consists substantially of a drive shaft 41 which extends horizontally on the rear side of the magazine rack 20 and is mounted rotatably on the side walls 32 of the machine frame 2. A reversible gear motor 42 is flange-mounted on the outer side of the machine frame 2, said gear motor 42 being adapted to driven the drive shaft 41 in rotation.

Figure 5:
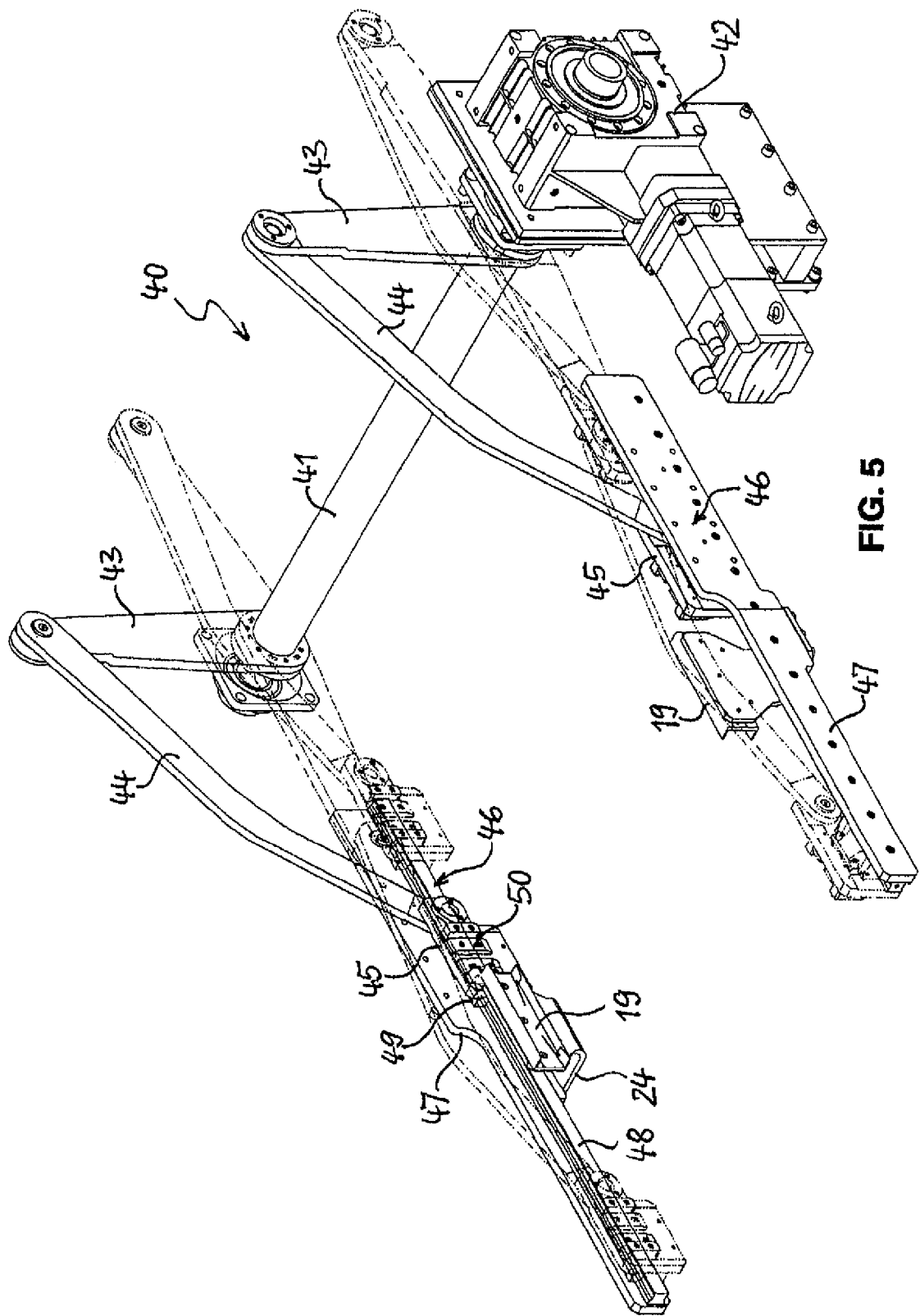
FIG. 5 shows a perspective view of the conveying device shown in isolation for the tire inflating device according to FIG. 1.

As FIG. 5 shows in particular, the drive shaft 41 comprises two cranks 43 extending radially in the same direction in the vicinity of the mounted ends of the drive shaft 41, said cranks being connected rotatably to coupling rods 44 at their free ends. The cranks 43 and the coupling rods 44 each move in a free space on the inside of the side walls 32, said space being formed by the spacers 31 between the side walls 32 and the guide rails 29 of the rack guide 28. The ends of the coupling rods 44 furthest from the cranks 43 are each connected to a drive head 45 by means of pivot joints, said drive head 45 being guided such that it can be moved along a drive head guide 46 in a parallel direction to the magazine guides 21 and the filling plate guide 18. The drive head guides 46 are fixed on the inside of the side walls 32 and consist of a mounting rail 47 and a guide rail 48 fixed to said mounting rail, said guide rail 48 being gripped by a sliding block 49 attached to the drive head 45.

The drive head 45 forms a coupling element 50 on its side facing away from the drive head guide 46, said coupling element being intended to connect to a counter-coupling element on the filling rings 11. The coupling-element 50 is designed such that only forces in the direction of motion of the drive head 45 can be transmitted to the counter-coupling element.

FIG. 5 illustrates the movements which can be executed by the conveying device 40. The continuous lines show a middle position in which the drive heads 45 are in the vicinity of the intermediate guide 19. The intermediate guide 19 is fixed to the mounting rail 47 some distance from the guide rail 48 by means of an elbow 24, so that the drive head 45 can pass the intermediate guide 19 without hindrance. The dashed lines illustrate the two end positions of the conveying movements which can be executed by the drive heads 45. In the extended end position of the cranks 43 and the coupling rods 44, the drive heads 45 are positioned at the ends of the drive head guides 46 remote from the drive shaft 41 and in a middle position on both sides of the filling plate 10. In the other end position, in which the cranks 43 and the coupling rods 44 are adjacent to each other, the drive heads 45 are positioned next to the center of the magazine guides 21 of the magazine 3 in which the drive heads 45 can be connected to a filling ring 11 located in the magazine 3.

FIGS. 3 and 4 show the magazine 3 with the filling rings 11 in position inside it. The magazine 3 has seven magazine guides 21 arranged on top of one another, and in FIG. 3 the top six of these guides each contain a filling ring 11. In FIG. 4 the fourth magazine guide 21 from the top is empty. The individual filling rings 11 consist of a cylindrical annular body 51 which is fixed in the hole of a frame 52 with its upper end and is equipped with an annular seal 53 on its upper face forming the first edge. The frames 52 are formed symmetrically and have parallel arms 54 on which a plurality of rollers 55 which are rotatably mounted around parallel axes are arranged. The distance separating the rollers 55 arranged on opposite sides of the frame 52 is the same for all frames 52 and adjusted to the uniform distance between the opposite guide rails 22 of the magazine guides 21 such that the rollers 55 can engage in an optimum manner in the guide rails 22 and roll into these rails with minimal friction.

A carrier 56 is fixed in approximately the center of each of the two arms 54 of the frame 52, said carrier 56 being in the shape of an upside down U, its top side gripping round the outside of the adjacent guide rail 22 and mounting rail 23. On the outer side of the carrier 56 there is a counter-coupling element 57 which extends in the direction of the filling ring axis. The carrier 56 also comprises a protruding shoulder 58 on its inner side facing the center of the filling ring, which forms a clamping anchor to which a clamping device located on the filling plate 10 can be applied.

The counter-coupling elements 57 of the carriers 56 of a filling ring 11 engage with the coupling elements 50 on the drive heads 45 when the drive heads 45 of the conveying device 40, as shown in FIG. 3, are in the rear end position and a filling ring 11' is brought by a vertical movement of the magazine frame 20 into the transfer position in which the magazine guide 21' holding the filling ring 11' is directly opposite the intermediate guide 19. This applies to the fourth magazine guide 21' and the fourth filling ring 11' counted from the top in each case in FIG. 3.

If, instead, the third filling ring 11" from the top is conveyed by the conveying device 40 to the filling plate 10, the magazine rack 20 must be lowered by the center-to-center spacing between the magazine guides 21 if the conveying device 40 is in the position illustrated in FIG. 3. As a result, the counter-coupling elements 57 of the fourth filling ring 11' move downwards out of the coupling elements 50 of the drive heads 45 and the counter-coupling elements 57 of the third filling ring 11" above this engage with the coupling elements 50 of the drive heads 45. Similarly, by moving the magazine rack 20 vertically, each filling ring 11 contained in the rack can be connected to the drive heads 45 of the conveying device 40 and then pushed out of the magazine guide 21 via the intermediate guide 19 into the filling plate guide 18 by driving the conveying device 40. As the conveying device 40 acts simultaneously on both arms 54 on a conveyed filling ring 11, this guarantees that the filling ring 11 moves easily and without sticking in the guides.

FIG. 4 shows the arrangement of the filling rings 11 in the magazine guides 21 in the magazine rack 20 and the way the machine frame 2 is guided and supported on the side walls 32 of the machine frame 2. The magazine rack 20 contains five filling rings 11 in this illustration, each having a different diameter and being mounted in guide rails 22 with rollers 55 positioned on the arms of their frames 52. The magazine guide 21 located in the transfer position is empty. The guide rails 22 are supported and fixed on mounting rails 23 which are each fixed on one of the two parallel frame stringers 25. Cross-beams 26, 27 connect the frame stringers 25 to each other. The frame stringers 25 are angled on the rear side of the magazine rack 20 and connected by means of struts 59, 60 running transversely and diagonally, said struts providing additional stability for the magazine rack 20.

The guide rails 29, which are guided to permit longitudinal movement in the sliding blocks 30, are located on the outer side of the frame stringers 25. Spacers 31 connect the sliding blocks 30 to the side walls 32 of the machine frame 2 and provide a free space between said walls and the magazine rack 20 in which the crank and the coupling rod of the conveying device 40 can move. The magazine rack 20 is held by the nut 37 which is held such that it cannot rotate and supported on the cross-beam 26 by a bearing 62 having spherical supporting surfaces. The nut 37 is engaged by its thread with the rotatable spindle 36, which is supported on the cross-member 35 connected to the side walls 32 by a bearing 61 having spherical bearing surfaces. The spindle 36 is mounted rotatably on the bearing 61 by means of an axial roller bearing and, by means of a coupling 63, is connected to the motor 38 which is also fixed on the cross-member 35. By turning the spindle 36 using the motor 38, the magazine rack 20 supported solely by the spindle 36 in the vertical direction can be raised or lowered. The axis of the spindle 36 is close to the center of gravity of the magazine rack 20, thus minimizing the shearing forces applied to the rack guide.

Figure 6:
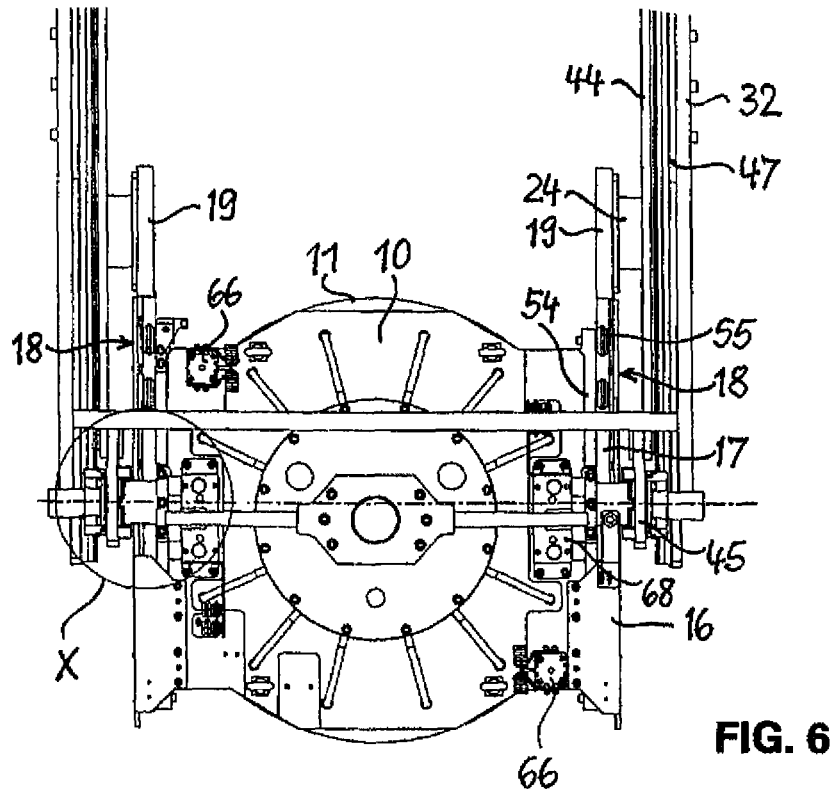
FIG. 6 shows a detailed view of the tire inflating device showing the filling plate from above.
Figure 7:
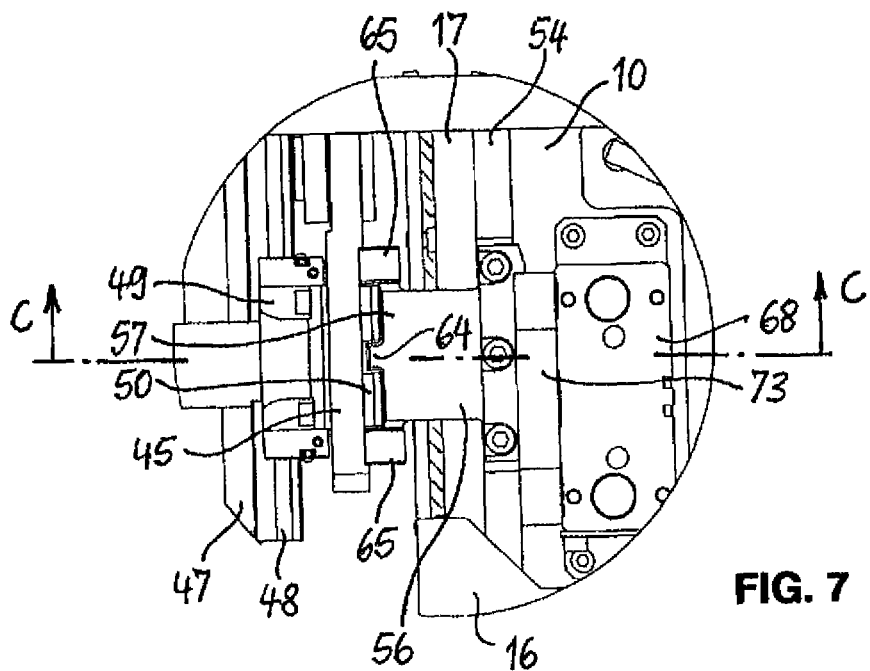
FIG. 7 shows an enlarged view of detail X according to FIG. 6.

In FIGS. 6 and 7, the conveying device 40 is shown in the extended end position in which a filling ring 11 is located in a centered position beneath the filling plate 10. The drive heads 45 connected to the coupling rods 44 by a pivot joint are guided in the guide rails 48 by the sliding blocks 49 and are connected to the counter-coupling elements 57 of the carriers 56 by the coupling elements 50. The carrier 56 shown from above in FIG. 5 is fixed to the frame 52 of the filling ring 11 by means of screws. The coupling element 50 has a slot in its center, in which a rib 64 formed by the counter-coupling element 57 engages. The counter-coupling element 57 is also gripped by projecting strips 65 which are located on both sides of the coupling element 50.

The filling ring 11 is mounted in the filling plate guide 18 by the rollers 55 attached to its frame 52. The upper arm of the guide rail 17 of the filling plate guide 18 has been removed in the illustration so that the rollers 55 can be seen. Actuators 66 to actuate a positioning pin and clamping devices 68 which can be actuated by actuators are arranged on the upper side of the filling plate 10, the mode of operation of said actuators being explained in greater detail below.

Figure 9:
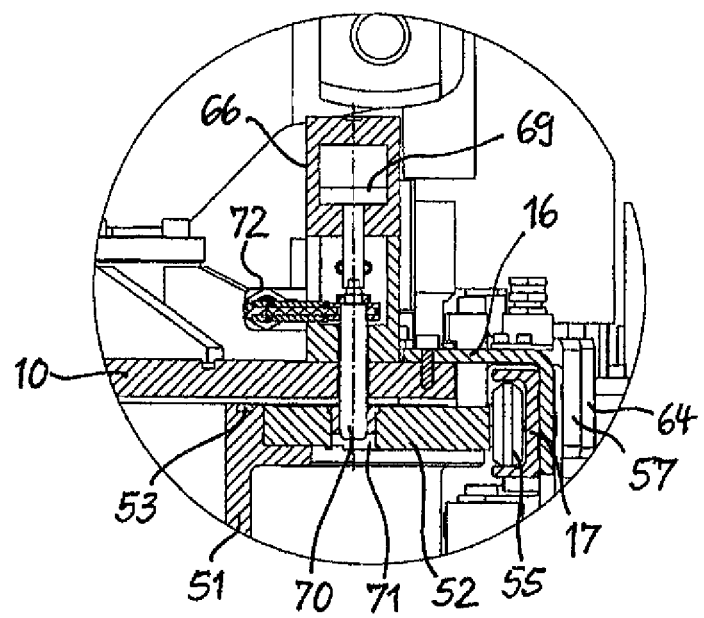
FIG. 9 shows an enlarged view of detail Y in FIG. 8.

FIG. 9 shows a detail Y of a cross-section through the filling plate 10 and the filling ring 11 positioned on the filling plate 10 including a section of the frame 52 with a roller 55 fixed to the frame 52, the roller 55 being positioned in the guide rail 17. The guide rail 17 is connected to the filling plate 10 by the mounting rail 16, the fixing area of which is also shown here in cross-section. The actuator 66 is positioned on the upper side of the filling plate 10 facing away from the filling ring 11 and comprises a piston 69 which can be actuated pneumatically and has a dual action for the purpose of moving a positioning pin 70. The positioning pin 70 is arranged in a hole in the filling plate 10 from which it protrudes in the positioning position, as shown in the drawing, and engages in a positioning hole 71 in the frame 52 of the filling ring 11 with its end. Such engagement is only possible when the filling ring 11 is in a centered position on the filling plate 10 and is detected by a sensor.

The filling ring 11 can be aligned in a second positioning hole in a similar manner with respect to the filling plate 10 by means of a second diametrically positioned actuator 66. Unambiguous, positive positioning of the filling ring 11 with respect to the filling plate 10 in the centered position can therefore be ensured by means of both actuators 66.

To change a filling ring 11, the positioning pins 70 are withdrawn from the holes in the filling plate 10 by reversing the actuators 66 so that the respective filling ring 11 can be displaced without obstruction in the filling plate guide 18 with respect to the filling plate 10.

Figure 10:
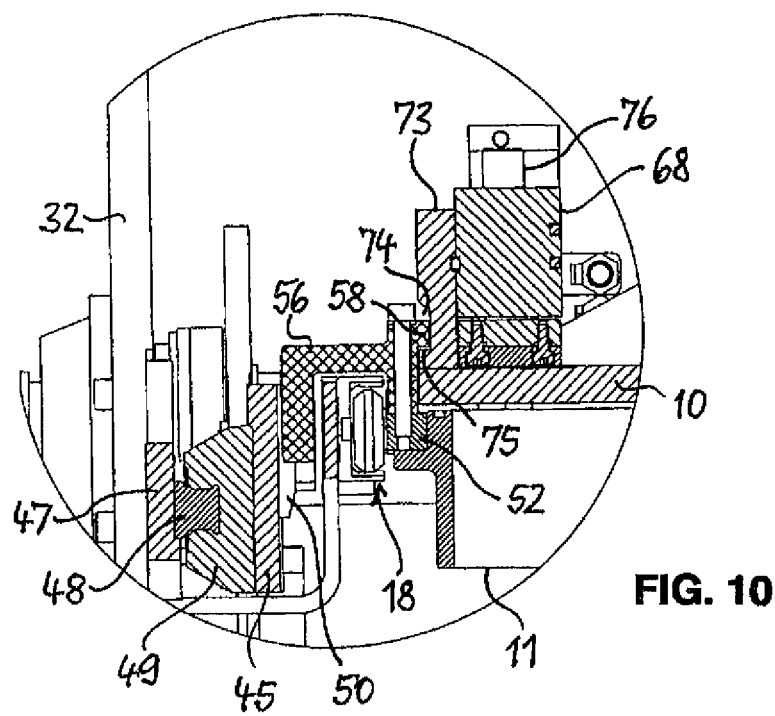
FIG. 10 shows an enlarged view of a cross-section along line C-C in the region of detail X in FIG. 6.

In order to guarantee that the filling ring 11 is sealed with respect to the filling plate 10 and relative movements between the filling ring 11 and the filling plate 10 are avoided during operation, the filling ring 11 is clamped by the clamping devices 68 after it is positioned by the positioning pins 70. The two clamping devices 68 are arranged centrally on the edges of the filling plate 10 adjacent to the guide rails 17 of the filling plate guide 18 and are thus located immediately adjacent to the carriers 56 arranged on the filling ring 11. As shown in FIG. 10, each clamping device 68 has a clamping arm 73 flush with the edge of the filling plate 10, and with a groove 74 arranged on its outer side, parallel with the filling plate 10, the groove 74 forming a clamping surface 75 parallel with the filling plate 10. In a released position, the clamping arm 73 lies with its lower end on the filling plate 10 and, for clamping, the clamping arm 73 can be moved upwards perpendicular to the filling plate 10 by means of actuators 76 which can be operated pneumatically.

The carriers 56 of the filling ring 11 adjacent to the clamping devices 68 each have a projecting shoulder 58 on their side facing the edge of the filling plate 10. The shoulder 58 protrudes some distance over the edge of the filling plate 10 and engages in the groove 74 of the clamping arm 73 of the clamping device 68. When the clamping device 68 is actuated, the shoulder 58 is abutted by the clamping surface 75 and the carrier 56 is carried along in the motion of the clamping arm 73. In this manner, the filling ring 11 which is firmly connected to the carrier 56 is pulled against the filling plate 10 with the first edge of said filling ring containing the seal 53 and thus clamped firmly to the filling plate 10. The actuators of the clamping device 68 remain in the clamping position whilst the filling bell is in operation and are only released to change the filling ring 11.

Before clamping firmly, the first edge of the filling ring 11 equipped with the seal 53 is located a small distance from the filling plate 10. This distance is advantageous so that the seal 53 does not come into contact with or touch the filling plate 10 whilst supplying and removing the filling ring 11, when it might become damaged. During clamping the filling ring 11 is therefore displaced towards the filling plate 10 by a clamping distance corresponding to the above distance. The rollers 55 in the guide rails 17 of the filling plate guide 18 must also be able to travel this clamping distance. The guide rails 17 of the filling plate guide 18 therefore have a corresponding excess width overall, or at least in the region in which the rollers 55 are positioned in the centered position, or indentations in the U-profile such that the rollers 55 cannot obstruct clamping of the filling ring 11.

Figure 8:
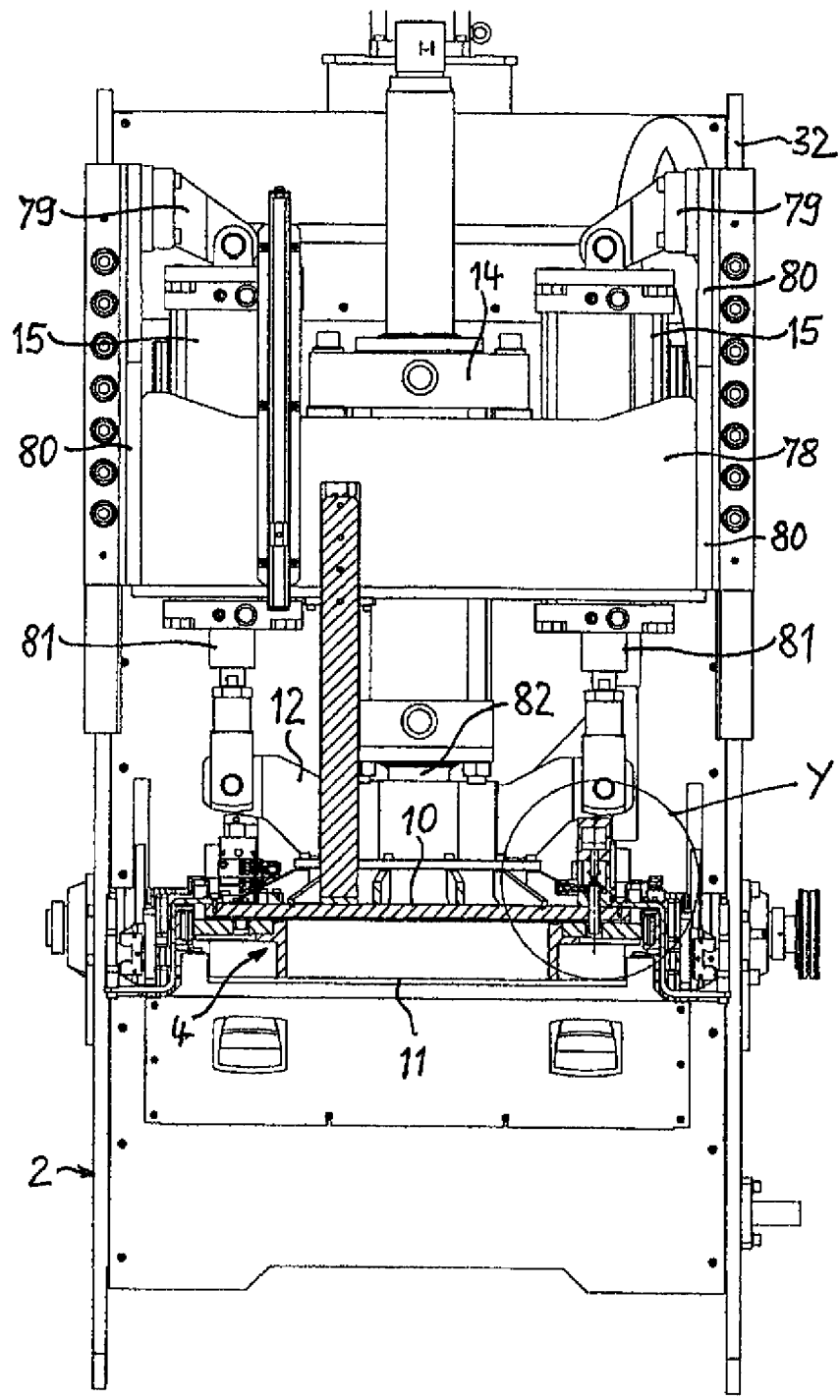
FIG. 8 shows a partial view of the tire inflating device with a cross-section through the filling bell along line B-B in FIG. 2.

FIG. 8 shows the arrangement of the control cylinder 14 and the two pneumatic cylinders 15 in the upper part of the tire inflating device 1. The centrally-positioned control cylinder 14 is fixed to a bridge girder 78 which connects the two side walls 32 together. The box-shaped bridge girder 78 comprises openings on both sides of the control cylinder 14 through which the pneumatic cylinders 15 extend. The pneumatic cylinders 15 are connected by joints with cylinder supports 79 at their upper ends, said supports being fixed to the side walls 32 and to the bridge girder 78 by means of anchor plates 80. The piston rods 81 of the pneumatic cylinders 15 are connected, by means of joints, to the ends of the yoke 12 fixed to the filling plate. The articulated suspension of the pneumatic cylinders 15 and their piston rods 81 has the effect that the pneumatic cylinders 15 adapt to the movements of the filling plate 10 so as to avoid constraining forces. The piston rod 82 of the control cylinder 14 is connected rigidly to the yoke 12, thus forming an axial guide for the filling bell formed by the filling plate 10 and the filling ring 11. The axis of the control cylinder 14 is in the center of the centered position of the filling rings 11 and coincides with the axis of rotation of a wheel arranged and centered on the supporting and sealing device 5. The control cylinder 14 and the pneumatic cylinders 15 are dual action. The pneumatic cylinders 15 are filled with compressed air in either direction of movement in order to move the tire filling bell 4. The control cylinder 14 is connected to a hydraulic control circuit and is used to control the movement of the tire filling bell 4 as it counteracts the force of the pneumatic cylinders 15. Precise positioning of the tire filling bell 4 on the tire to be inflated and control of the speed at which the tire filling bell 4 moves can also be achieved by means of the hydraulic control circuit.

The described tire inflating device is suitable for inflating tires for a wide range of wheels having different rim diameters due to the large number of filling rings, up to seven, with different diameters. Particularly accurate adjustment of the filling ring diameter to the rim diameters is required, especially with modern low-profile tires, with the result that known tire inflating devices having only one or two filling rings no longer meet the requirements. The design of the magazine means that the space required by the tire inflating device is minimal and depends specifically on the number of available filling rings in the overall height of the magazine. The tire inflating device is easy to maintain as sensitive and wear-prone components and seals are easily accessible and light and can be replaced. The filling rings are conveyed to the filling plate and back in an accurate and reliable manner, permitting high conveying speeds thanks to the robustness of the conveying device, and thus taking less time to change the respective filling rings. The design of the magazine drive device and the rack guide avoids constraining forces and permits precise adjustment of transfer positions. Finally, the tire inflating device described above is characterized by being simple and cost-effective to manufacture.

What is claimed is:

1. A tire inflating device to which a wheel comprising a wheel rim and a tubeless tire fitted to the wheel rim can be supplied, comprising a machine frame,
a supporting and sealing device adapted to support the wheel and to seal a filling chamber,
a tire filling bell arranged on the machine frame, and comprising a filling plate and a separate filling ring which can be selected from a plurality of mutually interchangeable filling rings with different diameters, and which can be moved into a centered position with respect to the axis of rotation of the wheel,
wherein the filling plate and a first edge of a filling ring located in the centered position are adapted to be applied to each other, and the filling plate is adapted to be moved along the axis of rotation together with said filling ring, and
wherein a second edge of the filling ring located in the centered position facing away from the filling plate is adapted to be applied against a side face of the tire, and
a magazine comprising a magazine rack having holders formed from magazine guides lying in a plurality of parallel planes intersecting the axis of rotation, each of the holders being adapted to movably hold a filling ring in the magazine guide, wherein the magazine rack and the filling plate are capable to be moved with respect to each other in the direction of the axis of rotation into a plurality of transfer positions in which the magazine guide of each of the holders is connected to a filling plate guide located on the filling plate, and a filling ring, which is located in the magazine guide arranged in the transfer position, can be conveyed by a conveying device into the filling plate guide and into the centered position on the filling plate.

2. The tire inflating device according to claim 1, wherein the magazine rack can be moved in the direction of the axis of rotation into the transfer position of the magazine guides by means of a magazine drive device arranged on the machine frame.

3. The tire inflating device according to claim 2, wherein the magazine rack is guided on the machine frame in a rack guide such that it can move, and wherein the magazine drive device comprises a spindle which can be driven in rotation and which has an outer thread, said spindle being engaged by its outer thread with a nut having an inner thread and being supported on the magazine rack such that it cannot rotate.

4. The tire inflating device according to claim 3, wherein the spindle is suspended vertically and supports the magazine rack, said spindle being rotatably mounted and fixed axially in an axial bearing supported on a cross-member of the machine frame, and the axial bearing and the cross-member are arranged such that the central axis of the spindle runs close to the center of gravity or in the center of gravity of the magazine rack loaded with filling rings.

5. The tire inflating device according to claim 4, wherein spherical bearing surfaces support the axial bearing of the spindle on the cross-member and the nut on a cross-beam of the magazine rack in each case, the central points of said bearing surfaces lying on the central axis of the spindle.

6. The tire inflating device according to claim 1, wherein the magazine guide arranged in the transfer position is connected to the filling plate guide by means of an intermediate guide that is fixed to the machine frame.

7. The tire inflating device according to claim 1, wherein each magazine guide for the filling rings comprises two parallel guide rails, and wherein the filling rings are equipped with a frame which comprises rotatably mounted rollers or sliding blocks on opposite sides, said rollers or sliding blocks forming a positive guide with the guide rails.

8. The tire inflating device according to claim 7, wherein the guide rails have a U-shaped profile, the hollow profile sides of the guide rails facing each other, and wherein the rollers or sliding blocks engage in the hollow profile sides when the frame of a filling ring is positioned between the guide rails.

9. The tire inflating device according to claim 1, wherein the conveying device is arranged on the machine frame and drives a drive head which is guided such that it can move on a drive head guide parallel with the magazine guides and which is adapted to be connected to a filling ring which is arranged in the holder which is in the transfer position.

10. The tire inflating device according to claim 9, wherein the conveying device comprises a crank mechanism having a crank driven by a motor and a coupling rod, which transfers the rotary motion of the crank to the drive head, the crank and the coupling rod are arranged in a free movement area between the magazine rack and the machine frame.

11. The tire inflating device according to claim 9, wherein the drive head comprises a coupling element which interacts with counter-coupling elements arranged on the filling rings and wherein the coupling element and the counter-coupling element are designed such that they can be engaged with each other or separated from each other as a result of a movement with respect to one another in the direction of the filling ring axis.

12. The tire inflating device according to claim 11, wherein the drive head guide is arranged on an inner side of the machine frame facing an outer side of the magazine rack, and wherein carriers are fixed to the filling rings, when the filling rings are positioned in the magazine said carriers grip around the magazine guides to the outside of the magazine guides and carry the counter-coupling element on their outer side facing the drive head guide.

13. The tire inflating device according to claim 1, wherein the filling rings have at least one positioning hole into which a movable positioning pin can be inserted when the filling rings are in the centered position on the filling plate, said positioning pin being movable by means of an actuator arranged on the filling plate.

14. The tire inflating device according to claim 13, wherein a sensor is arranged on the actuator and records the position of the positioning pin.

15. The tire inflating device according to claim 1, wherein clamping devices are arranged on the filling plate, which clamping devices are adapted to clamp a filling ring arranged in the centered position on the filling plate against the filling plate by means of its first edge.

16. The tire inflating device according to claim 15, wherein the clamping devices are arranged on the upper side of the filling plate facing away from the filling ring and have a clamping arm which can be moved perpendicular to the filling plate, said clamping arm gripping beneath a shoulder of an angled clamping anchor of the filling ring protruding over the edge of the filling plate.

17. The tire inflating device according to claim 16, wherein the clamping anchor is formed by a carrier of the filling ring, said carrier carrying a counter-coupling element interacting with a coupling element of the conveying device.

18. The tire inflating device according to claim 1, wherein two pneumatic cylinders and one hydraulic control cylinder are fixed to the machine frame in a parallel arrangement in order to move the tire filling bell, the piston rods of said control cylinder and said pneumatic cylinders being connected to the filling plate, and wherein the movement of the pneumatic cylinders can be controlled by the control cylinder.

* * * * *